United States Patent [19]
Patton

[11] 3,936,584
[45] Feb. 3, 1976

[54] FORMATION OF POLYPARABANIC ACID COATINGS AND FILMS BY SOLVENT TREATMENT OF POWDERED LAYER

[75] Inventor: Tad L. Patton, Baytown, Tex.

[73] Assignee: Exxon Research and Engineering Company, Linden, N.J.

[22] Filed: Sept. 17, 1973

[21] Appl. No.: 397,646

[52] U.S. Cl. .................. 428/458; 264/83; 264/343; 427/335; 427/195; 427/375; 428/474; 428/411; 260/77.5 R
[51] Int. Cl.² ...................... B05D 3/02; B05D 3/04
[58] Field of Search ................. 117/21; 260/77.5 R; 427/195, 335, 375; 428/458, 411, 474

[56] References Cited
UNITED STATES PATENTS

| | | | |
|---|---|---|---|
| 3,532,530 | 10/1970 | Denison et al. | 117/21 X |
| 3,547,897 | 12/1970 | Patton | 161/227 X |
| 3,557,691 | 1/1971 | Bayer | 117/21 X |
| 3,565,665 | 2/1971 | Stranch et al. | 117/21 |
| 3,635,905 | 1/1972 | Patton | 260/77 R |
| 3,661,859 | 5/1972 | Patton | 260/77.5 R |
| 3,676,171 | 7/1972 | Spiller et al. | 117/21 X |
| 3,676,172 | 7/1972 | Van Dyk et al. | 117/21 |
| 3,684,773 | 8/1972 | Patton | 260/77.5 R X |

*Primary Examiner*—William D. Martin
*Assistant Examiner*—Shrive P. Beck
*Attorney, Agent, or Firm*—David A. Roth

[57] ABSTRACT

This invention relates to processes and techniques for forming either coatings or self-supporting films from polymeric powders which melt at high temperatures (>150° C.) and cannot be made to fuse with the application of high temperatures. In particular, polyparabanic acid films and coatings are prepared from polyparabanic acid powders, utilizing vapors and mists of certain aprotic dipolar solvents.

24 Claims, No Drawings

FORMATION OF POLYPARABANIC ACID COATINGS AND FILMS BY SOLVENT TREATMENT OF POWDERED LAYER

BACKGROUND OF THE INVENTION

Coating surfaces with polymers is usually done by evaporating the solvent from a solution of the polymer on a surface or by thermally fusing a powder coating which has been applied by some method such as electrostatic spraying. The former technique requires relatively large volumes of solvent, because the solids content of solutions are usually 10–50%. Fusing powder coatings is receiving wider acceptance, because no solvent is required and very little polymer is lost in the process.

Polymers which have limited solubilities or whose solutions have unusually high viscosities at relatively low solids content are not practically suited for deposition from solutions. In addition, polymers which soften at high temperatures or cross-link rather than fuse or decompose at temperatures close to their softening points cannot be used, or find limited use in techniques whereby a dry powder coating is thermally fused into a continuous film.

For certain commonly used low melting thermoplastics such as polyvinylchloride and polyacrylates, powder coalescing techniques have been described, e.g. U.S. Pat. No. 3,676,171, and U.S. Pat. No. 3,676,172. Nevertheless, the techniques described in those patents are only applicable to a certain class of thermoplastics which soften at relatively low temperatures. Furthermore, the solvents used are not especially persistent and can be removed with considerable ease as opposed to the solvents used in the technique of the invention. In addition thereto, the conditions of use of the coalesing techniques of the art are different than that which will be described herein.

SUMMARY OF THE INVENTION

Powdered polyparabanic acid polymers can be formed into adherent coatings or self-supported films by a process comprising the application of powdered polyparabanic acid to a substrate followed by contact with relatively small portions of a suitable solvent followed by removal of the solvent to leave either an adherent coating or a self-supporting film.

DESCRIPTION OF THE INVENTION WITH PREFERRED EMBODIMENTS

This invention describes a technique for coating wires, cables, fabrics, solid surfaces, etc., with polymers, particularly with polymers which have high softening points and/or decompose or undergo undesirable changes at temperatures close to their softening points. The technique involves the following three general steps.

1. Deposit a coat of the polymer powder onto the surface by methods such as electrostatic spraying or by dipping the article to be coated into an electrostatically charged fluidized bed of the polymer powder.
2. Expose the powder coating to a spray, mist, fog, or vapors of a suitable solvent. An atmosphere saturated with warm solvent vapors is particularly suitable.
3. Heat the solvent-wetted powder coating to soften, plasticize, and coalesce the powder and then heat to evaporate the solvent.

A production line assembly of a powder coating unit, polymer-wetting unit, and evaporation unit can be set up to make the process continuous. The solvent vapors from the evaporation unit can be circulated back to the polymer-wetting unit so that a relatively small volume of solvent can be used for large quantities of polymer. If a spray or mist of solvent is used instead of solvent vapors to wet the powder coating, the solvent vapors from the evaporation unit could be condensed and circulated back to the spray or misting apparatus. This would prevent escape of such solvent vapors.

Objects may be coated several times by multiple passes through the three units to build up a (pin-hole free) coating. This will probably be required for wire and cable. (Multiple passes are frequently used when coating wires from polymer solutions).

In addition, wire and cables can be coated with successive layers of different polymers by using a separate assembly of the three types of units for each polymer. Use of a common solvent permits the use of common polymer-wetting and heating and drying units for all the polymer coatings.

If different polymers are used for each coating, it is advantageous to use a solvent for the second layer of polymer powder coating which would not attack or soften the preceding polymer coating. In this way successive layers of two or more polymers can be applied. They can be color coded for easy identification.

Flat, curved, and bent objects can also be coated by this general procedure.

This coating technique can also utilize a batch type process in which individual pieces are powder coated, wetted with a suitable solvent, and then heated to coalesce the powder and subsequently evaporate the solvent.

This technique offers the following advantages over solution coating techniques.

Low solvent requirements; the solvent can be recycled.

Shorter drying times, because less solvent must be evaporated.

Solution preparation is not necessary.

Applicable to polymers which have high softening points and/or decompose or undergo undesirable changes (such as forming a powdery char) at temperatures close to their softening points.

Thick (up to 20 mils) coatings may be made using thick powder coatings and/or multiple passes.

Polymers which can be applied as coatings by this technique include poly(parabanic acids), poly(iminoimidazolidinediones), polyimides, polysulfones, polyesters, polyamides, polyhydantoins, poly(iminohydantoins), poly(benzimidazole), poly(oxadiazoles), etc. The powders should be 1–500, preferably 5–100, microns in size. Course, large particles usually form rough irregular coatings. Smooth coatings and films are formed from fine particles.

Acceptable films can be made with powders up to 500 microns in size; however, preferably the size is 1 to 50 microns.

Solvents for wetting the powder coatings include dimethylformamide, dimethylacetamide, dimethyl sulfoxide, N-methyl pyrrolidone, cresol, butyrolactone, cyclohexanone, cyclopentanone, dioxolane, and/or any solvent which will wet the polymer powder coating and soften the polymer so it will coalesce into a continuous phase when heated.

The temperature at which the wetted polymer powder coating may be softened and fused together and the temperature required to evaporate all of the solvent from the polymer film will be determined by the polymer, the solvent, and the energy required to separate the solvent from the polymer coating. The temperature required to evaporate the solvent is higher than that required for coalescence to occur.

The particularly preferred polymers for the purpose of this invention, are poly(iminoimidazolidinediones) and polyparabanic acids, which have been described in several issued patents by the present inventor. Illustrative are U.S. Pat. No. 3,547,897 and U.S. Pat. No. 3,661,859, which are incorporated by reference in their entirety.

Self-supporting films can be formed by using the above technique to coat a surface to which the final coating will not adhere. Thus, a substrate can be coated with polytetrafluorethylene or a silicone releasing agent to permit easy removal of the film. Films can be formed on a drum which, when rotating, would pass through a powder coating section, a powder-wetting section, and a softening, coalescing, and drying section, and then stripped off.

Another continuous film forming operation would include a continuous belt (coated with a releasing agent if necessary) passing sequentially through a powder coating chamber, a powder-wetting chamber, and a drying oven wherein the softening, coalescing, and complete drying of the film occurs.

The finished film would then be stripped from the belt and, if necessary, passed through an additional drying oven or through an orientation process before being wound up on a spool.

Advantages of the technique of the invention are:
1. Large volumes of solvent to make solutions for film casting are not needed.
2. Solution preparation is eliminated.
3. Solvent vapors can be recirculated from the drying oven to the powder-wetting chamber without condensation if solvent vapors are used to wet the powder.
4. Shorter drying times than in solution casting because less solvent is used.
5. Thicker films (5 mils or greater) can be made and dried by this technique (compared to solution casting).
6. Films can be made from higher molecular weight polymers than could be made by solution casting techniques, because the viscosity of solutions of high molecular weight polymers is usually very high when the solids contents are in the desired range. Powder coating is independent of polymer molecular weight.

Flexible circuit boards can be formed, utilizing the process of the invention, by powder coating a release-agent-coated substrate on which was first placed a pre-cut circuit. The powder coating will cover the pre-cut circuit as well as the exposed areas of the substrate. Subsequent exposure to solvent vapors and heating will form a circuit board.

Another highly significant advantage of this invention is the utilization of other compatible powdered polymeric materials or blends of powdered polymeric materials which are soluble to approximately the same degree in the solvent used so that when these powders coalesce, solid blends result, which can have a wide variety of divergent properties.

The polyparabanic acids and other high-performance, high-temperature polymers which can be used in this invention have particular applicability for coatings in process tank linings and in pipes.

Electrostatic fluid bed techniques can be used for this purpose. Organic materials have been used for some time to line process tanks and pipes. But they suffer from various disadvantages. Primary among these is their lack of resistance to organic solvents at high temperatures. Polyparabanic acid polymers are exceptionally resistant to most organic materials at very high temperatures, e.g. in the 400° F. range. Coatings such as fluorocarbons which do have excellent resistance to most chemicals are not used as linings in chemical engineering processes for several reasons. One of these is that they have high permeability in thin films. The other is that they are difficult to permanently adhere to most substrates.

In contrast, the polyparabanic acids of the invention do not suffer from these disadvantages. The excellent adhesiveness of the polyparabanic acids to metal and most other substrates is a function of the presence of polar atoms in the structure.

However, the exceptional adhesiveness noted with the use of the solvent vapor technique of the invention is attributable to the fact that the solvents not only coalesce the polymer to cause it to flow into a uniform coating, but they also solvate the surface of the substrate. This results in excellent wetting and contact between the polymer and the substrate surfaces and permits the adherence of PPA coatings to all types of metals, plastics and other substrates. This is a very important advantage.

The invention will be further illustrated by the following examples:

EXAMPLE 1

The following four experiments demonstrate the failure of a dry PPA coating to be formed when powder-coated sheets of steel and aluminum were heated in an oven at 315° C., and the successful coating of similar metal sheets with PPA when the powder coats were first exposed to vapors of different solvents. Small (2 × 4 inch) sheets of steel and aluminum were coated with (PPA, softening point: 289° C.) by electrostatic spraying. The powder-coated sheets were treated as follows:
  a. Heated in an oven at 315° C. for 1 hour and 24 hours. The result was a powdery infusible coating in each case. The powder was very dark but not a carbonaceous char.
  b. The powder-coated plate was immersed in hot vapors of dimethylformamide until the coating appeared wetted. The powder did not coalesce into a film until it was heated. After heating in an oven 20 minutes at 150° C. a smooth transparent, continuous, adherent, coating formed.
  c. The powder-coated plate was sprayed with a fine mist of dimethylformamide from an atomizer until it appeared to be wetted. As in Example (b), the powder did not coalesce into a continuous film until heated at 150° C. It then formed a clear smooth continuous, adherent coating on the metal surface.
  d. The powder-coated plates were sprayed with a cyclopentanone mist from an atomizer until the coating was wetted. It was then heated at 120° C. to form a transparent smooth continuous adherent film.

NOTE: In each case the powder coatings were heated at a temperature slightly below the boiling point of the particular solvent used for wetting: DMF, b.p. 153° C.; cyclopentanone, b.p. 130° C.

The "wetted" coating did not contain droplets of solvent, rather the solvent was absorbed into the powder and changed the appearance of the latter.

EXAMPLE 2

An aluminum sheet was powder-coated with (PPA, inherent viscosity = 2.15; particle size ≤ 50 microns) using an electrostatic spray gun.

The coating was exposed to vapors of dimethylformamide about 2 inches above the surface of the boiling solvent. After the coating was wetted it was placed in an oven at 150° C. for 15 minutes. A smooth transparent hard coating was formed.

EXAMPLE 3

This example was carried out exactly as described in Example 2, except that a mist of N-methylpyrrolidone from an atomizer was used to wet the powder coating. After heating 15 minutes at 150° C. the coating also formed a hard clear continuous film.

EXAMPLE 4

Examples 2 and 3 were repeated using a PPA powder with an inherent viscosity of 2.06 and a softening point of 298° C. (particle size: 100–200 microns). Continuous clear coatings were formed when dimethylformamide and N-methylpyrrolidone were used to wet the powder coatings. The coatings were more irregular (rougher) than those made from the finer PPA powder in Examples 2 and 3.

EXAMPLE 5

This example demonstrates the formation of flexible circuit boards using the technique of the invention as follows:

Stainless steel plates (6 × 6 inches) were coated with "Fre Kote", a commercial release agent. Then half inch wide strips of copper foil were taped around the plates to simulate a circuit.

The plate and copper strips were then powder coated with a PPA powder (particle size ≤ 50 microns) using an electrostatic spray gun.

Then the powder coat was wetted with a fine mist of N-methyl pyrrolidone from an atomizer. It was heated in an oven at 150° C. for 20 minutes. The smooth film was easily removed from the steel plate with the copper foil firmly adhered to it.

EXAMPLE 6

Example 5 was repeated except that a thicker powder coating of PPA was used. It was sprayed with a mist of dimethylsulfoxide. The resulting film was dried 15 minutes at 200° C. A clear smooth film to which was adhered copper strips was formed.

EXAMPLE 7

The procedure of Example 6 was repeated using a PPA powder formed from diphenyl ether diisocyanate. The film formed was clear but not as smooth as that using the more finely divided PPA of the previous examples which was formed from diphenyl methane diisocyanate (powder size of PPA: 100–200 microns).

EXAMPLE 8

This example demonstrates the formation of self-supporting films.

An aluminum sheet (12 × 15 inches) was precoated with "Fre Kote", a commercial release agent.

It was then coated with PPA powder (particle size: ≤ 50 microns) by electrostatic spraying. The powder coat was wetted with a fine mist of N-methyl pyrrolidone from an atomizer and then heated 15 minutes at 150° C. A clear continuous self-supporting film having the same dimensions as the aluminum substrate was formed.

EXAMPLE 9

Example 8 was repeated except dimethylsulfoxide was used as the solvent. The wetted powder coat was heated 15 minutes at 175° C.

EXAMPLE 10

Small (5 inch diameter) aluminum pans were powder coated with PPA as described for the metal sheets in Example 3. It was similarly wetted with N-methyl pyrrolidone and heated at 150° C. The pans had smooth clear coating of PPA.

EXAMPLE 11

Example 10 was repeated using powdered PPA formed from diphenyl ether diisocyanate. Separately coated pans were wetted with dimethylsulfoxide and N-methylpyrrolidone before they were heated. The pans were coated with a clear film of this PPA; however, the coatings were not as smooth as that made with the more finely divided PPA in Example 10.

EXAMPLE 12

Both wire and cable were coated with PPA using the techniques described above. The PPA powder (particle size ≤ 50 microns) was electrostatically sprayed onto both the wire and cable. The coated wires and cables were exposed to warm vapors of dimethylsulfoxide and then heated 15 minutes at 200° C. The results obtained with various wires and cables are described below.

a. Small diameter (1/16 inch) copper wire was uniformly coated with a film of PPA after one pass. Successive passes of the wire through a powder-coating, wetting, and heating chambers increased the thickness of the coating and eliminated pinholes.

b. A square (3/32 inch on each side) copper wire was uniformly coated with a film of PPA which was thicker after one pass than that formed on the small diameter wire in (a), because the powder coat was thicker.

c. Cable copper wire (10 strands per cable) was coated using the techniques described above in (b) and (c).

None of the wire and cable coatings cracked when the wires were bent back on themselves.

What is claimed is:

1. A method for producing structures from solid polymeric materials having repeating heterocyclic rings of the following structure:

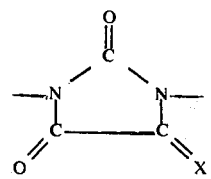

where X is NH or O, which comprises depositing a layer of a fine powder of said polymer on a supporting substrate and subjecting said powder layer on said substrate to the action of the vapor or spray or mist or fog, of a aprotic dipolar solvent for said powder until said powder particles are wetted with not more than 25 wt. % with solvent, subsequently heating the wetted powders to cause said powder to flow and coalesce below the boiling temperature of said solvent and subsequently heating the resulting coating to remove the absorbed solvent and cause said film to adhere tightly to said substrate unless said substrate has been treated or selected so as not to have an affinity for said polymer.

2. A method according to claim 1 wherein said polymer is a polyparabanic acid made from diphenyl methane diisocyanate.

3. A method according to claim 1 wherein said polymer is a poly(iminoimidazolidinedione).

4. A method according to claim 1 wherein said solvent is dimethylformamide.

5. A method according to claim 1 wherein said solvent is cyclopentanone.

6. A method according to claim 1 wherein said solvent is dimethylsulfoxide.

7. A method according to claim 1 wherein said solvent is N-methylpyrrolidone.

8. A method according to claim 1 where the resulting film is over 5 and up to 20 mils in thickness.

9. A method according to claim 1 wherein said polymer has a molecular weight of 35,000 to 300,000.

10. A method according to claim 1 wherein said substrate is metallic.

11. A method according to claim 10 wherein said substrate is ferrous metal.

12. A method according to claim 11 wherein said metal is steel.

13. A method according to claim 10 wherein said metal is nonferrous.

14. A method according to claim 13 wherein said metal is copper.

15. A method according to claim 13 wherein said metal is aluminum.

16. An article of manufacture comprising a substrate and a strongly adherent film thereto of polyparabanic acid, which film has been placed on said substrate by the method of claim 1 and utilizes no supplementary adhesives.

17. An article according to claim 16 wherein said substrate contains a major quantity of copper.

18. An article according to claim 16 wherein said substrate is a ferrous metal.

19. A method according to claim 1 wherein said substrate has been selected or treated so as not to have an affinity for said polymer.

20. A self-supporting article made by removing the coating made according to the process of claim 19.

21. A process according to claim 1 wherein said substrate is a wire.

22. A process according to claim 1 wherein said substrate is a cable.

23. A method according to claim 1 wherein said polymer is a polyparabanic acid made from diphenyl ether diisocyanates.

24. A method according to claim 1 where the resulting film is 0.5 to 5 mils thick.

* * * * *